United States Patent
Brown et al.

(10) Patent No.: US 6,186,732 B1
(45) Date of Patent: *Feb. 13, 2001

(54) CONVEYOR MECHANISM

(75) Inventors: Thomas R. Brown, Oregon; Randal L. Zerbe, Rockford; Patrick C. O'Brien; James K. Bertsch, both of Oregon, all of IL (US)

(73) Assignee: E.D. Etnyre & Co., Oregon, IL (US)

( * ) Notice: Under 35 U.S.C. 154(b), the term of this patent shall be extended for 0 days.

This patent is subject to a terminal disclaimer.

(21) Appl. No.: 09/337,617

(22) Filed: Jun. 21, 1999

Related U.S. Application Data

(63) Continuation-in-part of application No. 08/886,599, filed on Jul. 1, 1997, now Pat. No. 5,934,862
(60) Provisional application No. 60/023,799, filed on Aug. 6, 1996.

(51) Int. Cl.[7] .................................................. B65G 17/12
(52) U.S. Cl. ......................... 414/528; 198/833; 198/840
(58) Field of Search .............................. 414/327, 528; 198/833, 840, 841

(56) References Cited

U.S. PATENT DOCUMENTS

| | | | |
|---|---|---|---|
| 2,371,747 | 3/1945 | Faris et al. | 18/6 |
| 2,863,555 | 12/1958 | Jaritz | 198/203 |
| 3,034,637 * | 5/1962 | Swezey et al. | 198/840 X |
| 3,082,857 | 3/1963 | Holloman, Jr. | 198/57 |
| 3,082,858 * | 3/1963 | King | 198/840 X |
| 3,186,536 * | 6/1965 | Hinchcliffe | 198/840 X |
| 3,261,452 | 7/1966 | Thomson | 198/208 |
| 3,289,817 | 12/1966 | McLaughlin | 198/184 |
| 3,593,864 | 7/1971 | Moser | 214/83.36 |
| 3,876,089 | 4/1975 | Moser | 214/83.36 |
| 3,967,720 | 7/1976 | Arieh | 198/193 |
| 4,015,484 * | 4/1977 | Taylor | 198/840 X |
| 4,055,265 | 10/1977 | Eisenman | 214/17 |
| 4,058,204 | 11/1977 | Arieh | 198/833 |
| 4,068,769 | 1/1978 | Sweet et al. | 214/83.18 |
| 4,225,036 * | 9/1980 | Michael | 198/840 |
| 4,664,583 | 5/1987 | Gust | 414/528 |
| 4,880,109 | 11/1989 | Sarasola | 198/833 |
| 5,102,285 | 4/1992 | Gust | 414/528 |
| 5,104,281 | 4/1992 | Corvi | 414/528 |
| 5,795,124 * | 8/1998 | Kitten et al. | 414/528 X |
| 5,934,862 * | 8/1999 | Brown et al. | 414/528 |

FOREIGN PATENT DOCUMENTS

| | | |
|---|---|---|
| 488919 A2 | 11/1990 | (EP) . |
| 405294428A | 11/1993 | (JP) . |
| 1602 819 | 10/1990 | (SU) . |
| WO88/03117 | 5/1988 | (WO) . |

* cited by examiner

Primary Examiner—James W. Keenan
(74) Attorney, Agent, or Firm—Leydig, Voit & Mayer, Ltd.

(57) ABSTRACT

A conveyor mechanism is provided for transporting objects. The conveyor mechanism, includes a single continuous belt member wrapped around a plurality of chain loops and also around a pair of spaced-apart pulleys disposed outboard thereof. A chain drive drives the chain loops and the chain loops drive the surrounding belt. A frame having substantially frictionless channel guides provides additional support to the upper track portion of each chain so that the belt member can accommodate heavy loads. The belt has at least one guide ridge formed in its substantially flat undersurface. The belt turning rollers are provide with circumferential grooves which are sized to engage the raised guide ridge on the undersurface of the belt, so that cooperation between the grooves in the turning rollers and the ridge on the belt maintains lateral tacking of the belt. Further lateral stability is provided by disposing of pair of chain guides on either side of the ridge along the upper run of the belt.

16 Claims, 8 Drawing Sheets

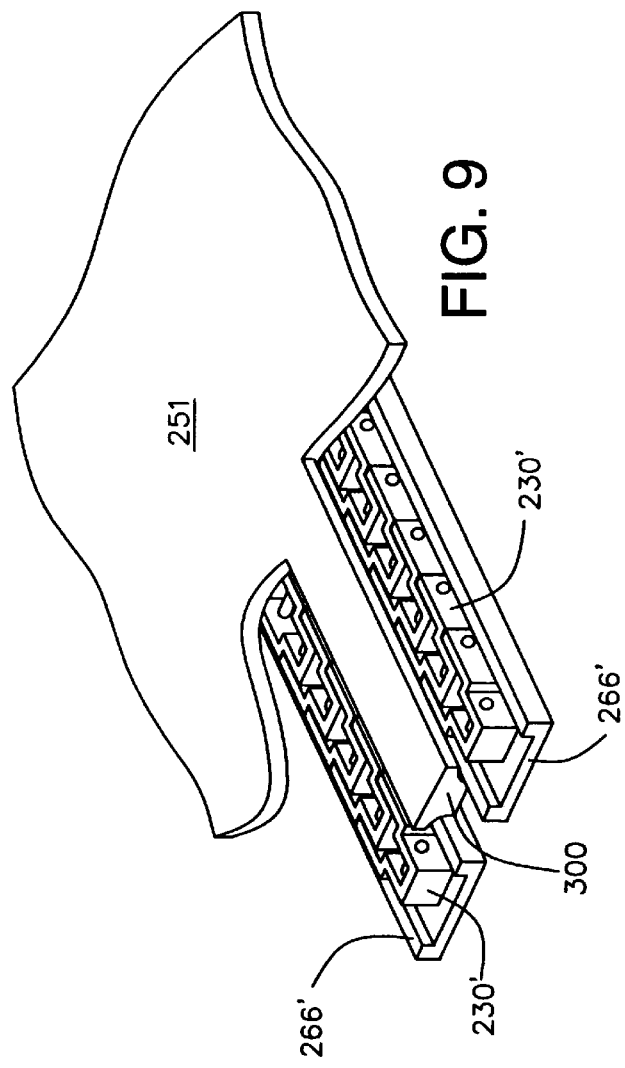
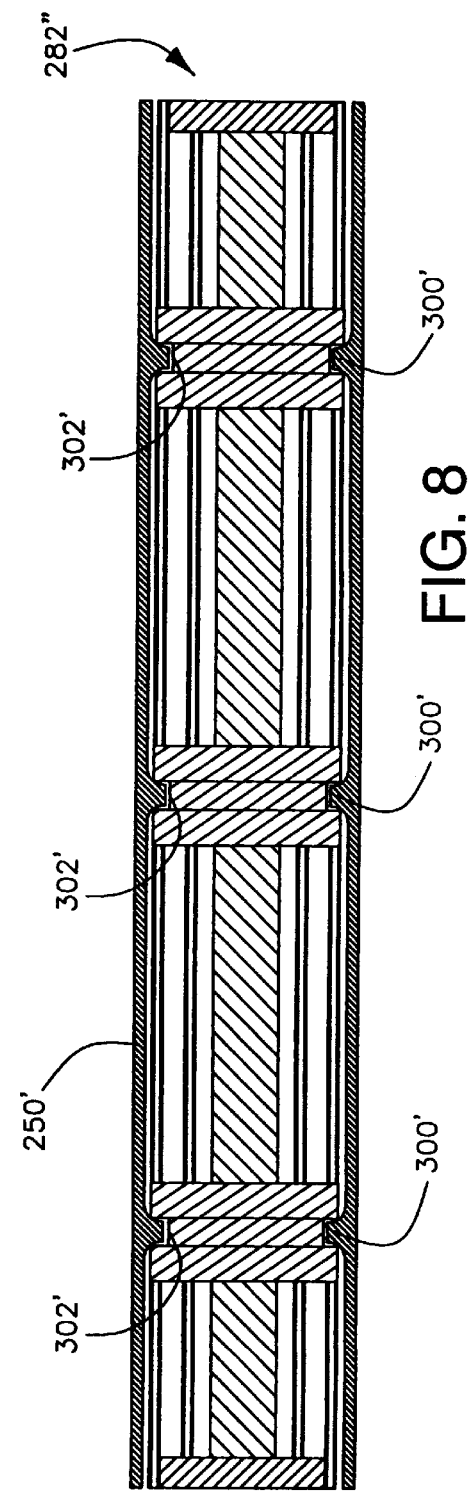

CONVEYOR MECHANISM

RELATED APPLICATIONS

This application is a continuation-in-part of U.S. patent application, Ser. No. 08/886,599, filed Jul. 1, 1997, now U.S. Pat. No. 5,934,862, and claims the benefit of Provisional Application Serial No. 60/023,799, filed Aug. 6, 1996.

FIELD OF THE INVENTION

The present invention relates generally to conveyor equipment and, in a particular use, to a conveyor mechanism for loading and unloading cargo from a trailer or the like.

BACKGROUND OF THE INVENTION

Conveyor mechanisms for loading and unloading cargo are well known. Such conveyor mechanisms are commonly used, for example, to load and unload various products (e.g., bulk agricultural crops, aggregate material, construction material, boxes, crates, etc.) from a vehicle (e.g., a trailer, a semi-trailer, a wagon, a truck, etc.).

Such conveyor mechanisms typically include a pair of chain loops disposed within and along the floor (or bed) of the trailer. The chain loops are usually engaged by a pair of drive sprockets arranged on a first axle and also by a pair of associated idler sprockets arranged on a second axle. Because the axles are ordinarily disposed at opposite ends of the trailer, the chain loops are generally obround in shape. A plurality of transverse slats extending between links of the opposed chains provide support to the chain loops and enable the conveyor mechanism to transport heavier loads. Such conveyor mechanisms are commonly known as slat-type conveyors. Examples of these types of devices are provided by U.S. Pat. Nos. 3,876,089 (Moser), 4,055,265 (Eisenman), 4,664,583 (Gust), and 5,102,285 (Gust).

In order to prevent abrasive material from damaging the chains, some slat-type conveyors include flexible belting which spans the width between the chains. By way of example, U.S. Pat. No. 4,664,583 (Gust) discloses a slat-type conveyor in which a plurality of segmented belts are attached to the slats. U.S. Pat. No. 5,102,285 (Gust), in contrast, discloses a slat-type conveyor in which a single continuous belt which is wrapped around the chains and is affixed to the various slats. The single belt slat-type conveyor disclosed in U.S. Pat. No. 5,102,285 (Gust), however, suffers from noted deficiencies which will be discussed herein.

First, in order to prevent slipping, bunching, and/or stretching of the belt at the points where the chains reverse direction (i.e., at the ends of the generally obround chain loops), the pitch diameter of the chains must coincide with the pitch diameter of the belt. In order to align these pitch diameters, however, the chain loops must be located outboard (i.e., beyond the width) of the belt. As a result, the belt cannot be wrapped around the chain loops, but must instead be wrapped around the slats which interconnect the chain loops. Furthermore, single belt slat-type conveyors of this type are limited to only two chain loops (i.e., one chain loop on either side of the width of the belt).

Second, single belt slat-type conveyors of this type are expensive to manufacture and service. For instance, because the load of the cargo is ultimately shared by only two chain loops, both of these chains need to be very sturdy (i.e., large and expensive). In a like manner, the slats interconnecting the two chain loops need to be spaced-apart at relatively close intervals (i.e., numerous slats are required). Also, the belt needs to be joined to the slats at regular intervals. This not only significantly increases assembly labor, but also makes field disassembly and repair extremely difficult and time consuming.

Third, single belt slat-type conveyors of this type are subject to damage by the contents of the cargo. The slats, for example, are susceptible to deformation by rocks or other solid objects in the trailer. The chains are also prone to damage because they ultimately support the weight of the cargo. More significantly, however, should one of the chains break during use, virtually all of the slats would be destroyed.

Fourth, single belt slat-type conveyors of this type are subject to inherently high frictional losses caused, in part, by the weight of the cargo. More specifically, the weight of the cargo frequently causes the slats to wear or rub against the bed of the trailer which, in turn, increases the power requirements of the motor.

SUMMARY OF THE INVENTION

In our parent application we disclosed a conveyor mechanism having a single belt driven by a plurality of chains which underlie and support the belt. The chains and the belt are turned on different guiding rollers so as to avoid bunching or slippage at the turning points, but on the main horizontal run of the belt, the belt and the chains move at the same speed. The chains are carried in supporting tracks, and the plurality of chains in their respective tracks both supports and drives the load carried on the belt.

The load on the belt can be significant and at times will attempt to cause the belt to move laterally as it is driven along the longitudinal axis for loading or unloading. There are some materials, such as for example loads of large rocks which can impose uneven loading on the belt, and cause the mechanism to deviate from the normal longitudinal rotation for which it is designed. There are other cases where loads, such as hot blacktop material can creep under the belt and foul the drive mechanism if the belt tracks away from its centered lateral position.

The present invention has for its aim the further improvement of our conveyor mechanism to assure that side to side lateral tracking is maintained.

Thus, it is an object of the invention to enhance our conveyor apparatus with a simple and very reliable mechanism for maintaining lateral tracking of the belt, and without substantially complicating the simplicity or compromising the ruggedness of the conveyor apparatus.

A further object of the invention is to provide such a mechanism which does not substantially increase the load on the prime mover which drives the belt.

It is a related object to provide a mechanism for maintaining lateral tracking of the belt in a live bottom trailer conveyor mechanism which does not substantially increase the cost or compromise the reliability of the basic live bottom trailer apparatus.

A further object of the present invention is to provide a single belt conveyor mechanism which is capable of supporting and moving relatively heavy cargo loads without danger of the belt laterally deviating from its intended path.

Another object of the present invention is to provide a single belt conveyor mechanism that which is less susceptible to damage than presently-employed single belt slat-type conveyor mechanisms, and is not prone to lateral mistracking of the belt.

Yet another object of the present invention is to provide a single belt conveyor mechanism which is less prone to frictional losses than presently-employed single belt slat-type conveyor mechanisms and is also configured to avoid lateral mistracking of the belt.

Other objects and advantages will become apparent upon reference to the following detailed description when taken in conjunction with the drawings and which:

BRIEF DESCRIPTION OF THE DRAWINGS

In the drawings, wherein similar reference numerals denote similar elements throughout the several views:

FIG. 8 is a partial sectional view taken along the line 8—8 of FIG. 7, but modified to show a plurality of guide ridges interfacing with a plurality of turning roller guides; and FIG. 9 is a partial sectional view showing a pair of chains carried by chain guides and bracketing a guide ridge on the belt.

Figure 1:
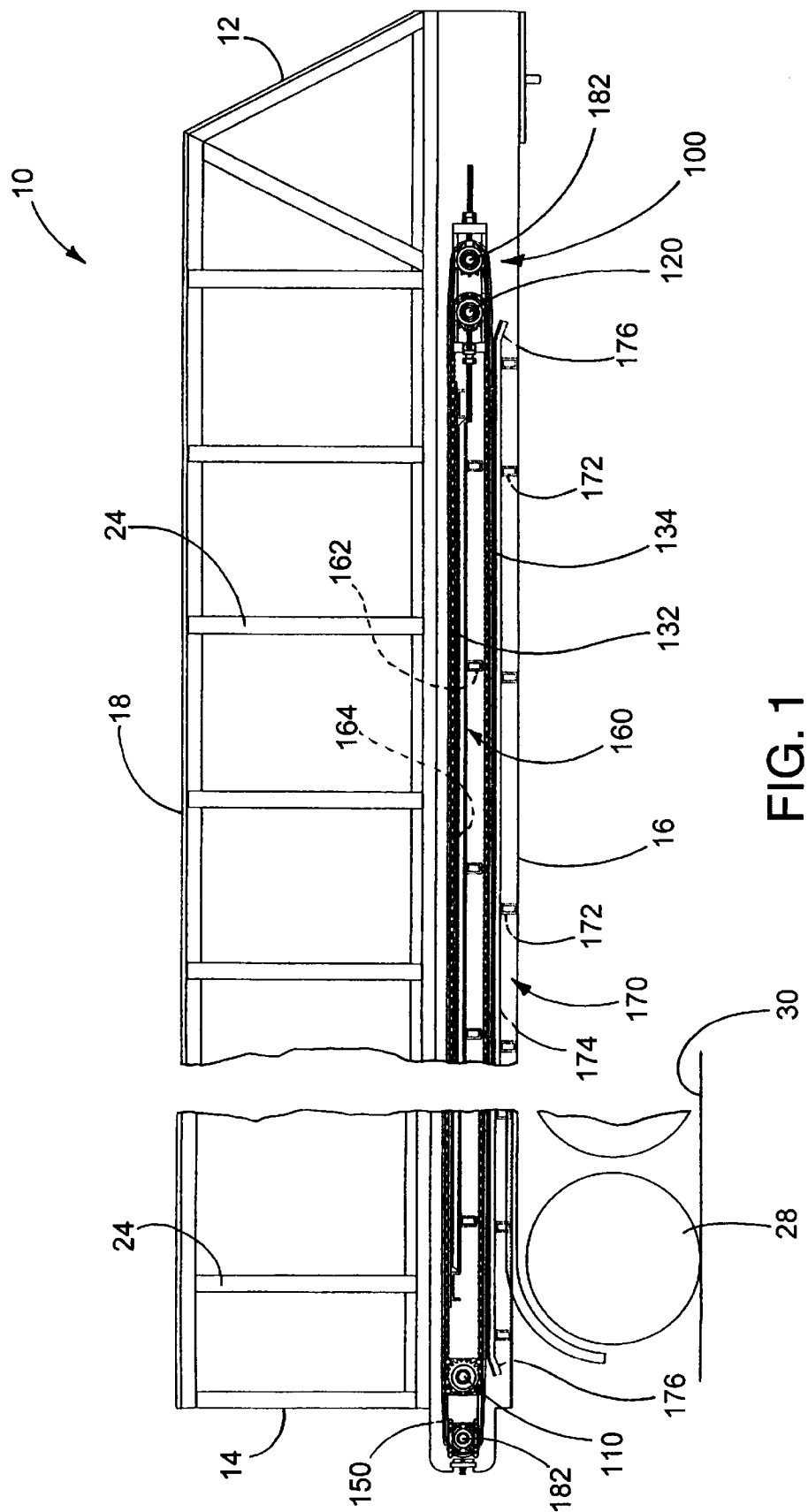
FIG. 1 is a partially fragmentary side elevational view of a trailer having a conveyor mechanism constructed in accordance with the teachings of the present invention.

While the present invention will be described and disclosed in connection with certain preferred embodiments and procedures, the intent is not to limit the present invention to these specific embodiments. On the contrary, the intent is to cover all alternatives, modifications, and equivalents that fall within the spirit and scope of the present invention as defined by the appended claims.

DETAILED DESCRIPTION OF THE PREFERRED EMBODIMENTS

Turning now to the drawings, a conveyor mechanism constructed in accordance with the present invention and designated generally by reference numeral 100 is provided for transporting cargo (e.g., bulk agricultural crops, aggregate material, construction material, boxes, crates, etc.) relative to a structure. In accordance with one preferred embodiment of the present invention, the structure comprises a trailer assembly 10, and the conveyor mechanism 100 is mounted therein. Although the conveyor mechanism 100 of the present invention will be described and illustrated herein as being mounted within and transporting cargo relative to this trailer 10, it will be appreciated by those skilled in the art that the conveyor mechanism 100 may alternatively be used in other applications where heavy objects need to be moved.

Figure 2:
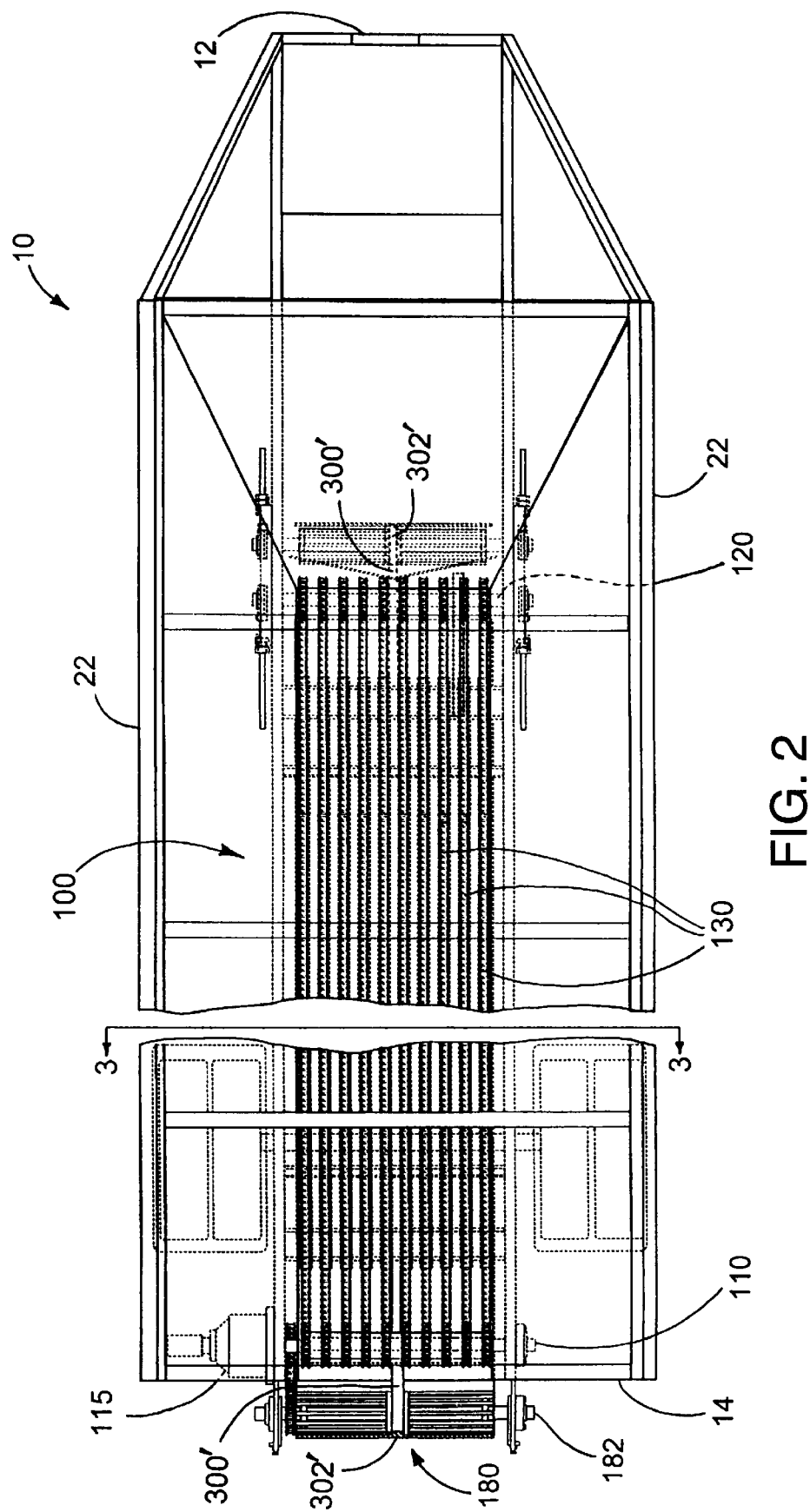
FIG. 2 is a top plan view of the conveyor mechanism and trailer depicted in FIG. 1.
Figure 3:
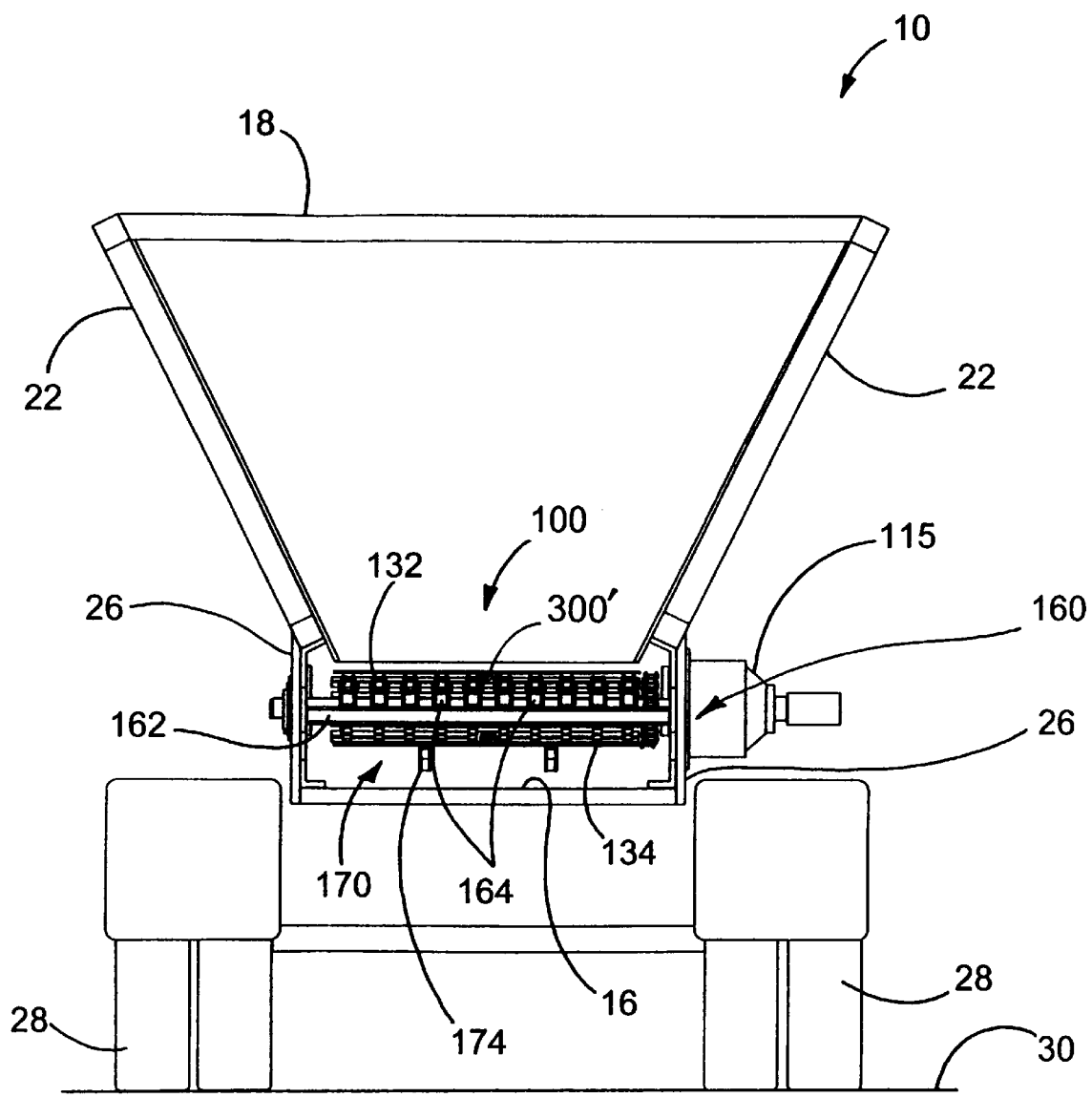
FIG. 3 is a cross-sectional view of the conveyor mechanism and trailer, as seen in the direction of line 3—3 in FIG. 2.

Referring initially to FIGS. 1–3, the trailer assembly 10 includes a forward end 12, a rear end 14, a bottom surface 16 (i.e., a floor or a bed), a top portion 18 (which may be open), and a pair of opposed sidewalls 22. In practice, the opposed sidewalls 22, the forward end 12, the rear end 14, and the conveyor mechanism 100 of the present invention define a bin where cargo is received. As is customary in the art, the bottom surface 16 of the trailer assembly 10 is spaced-apart from the ground 30 by a plurality of wheels 28, as shown, for example, in FIGS. 1 and 3. In addition, the forward end 12 of the trailer assembly 10 is adapted for connection to a tractor cab (not shown), which tows the trailer.

In the illustrated embodiment, the opposed sidewalls 22 extend between the forward and rear ends 12 and 14 of the trailer 10. The opposed side walls 22 also slope downwardly and inwardly from the top portion 18 of the trailer 10, as shown in FIG. 3. Because the trailer assembly 10 is intended for hauling heavy material, the opposed side walls 22 may also be reinforced with a plurality of bracing elements 24, as shown, for example, in FIG. 1. Each sidewall 22 also includes a substantially vertical support plate 26 disposed at the lower end thereof. As best shown in FIG. 3, the conveyor mechanism 100 is mounted to, supported by, and positioned between the vertical support plates 26. The conveyor mechanism 100 is also positioned between the bottom surface 16 of the trailer 10 and the lower ends of the inclined sidewalls 22. The tapered wall hopper shown in the drawings is preferred for applications such as hauling heavy granular material such as stone or aggregate. In other applications, such as for hauling produce, a more conventional straight-sided bin will be preferred. Accommodating the various bin shapes is accomplished simply by establishing the appropriate width and underlying support for the conveyor as will be described in detail herein.

Figure 4:
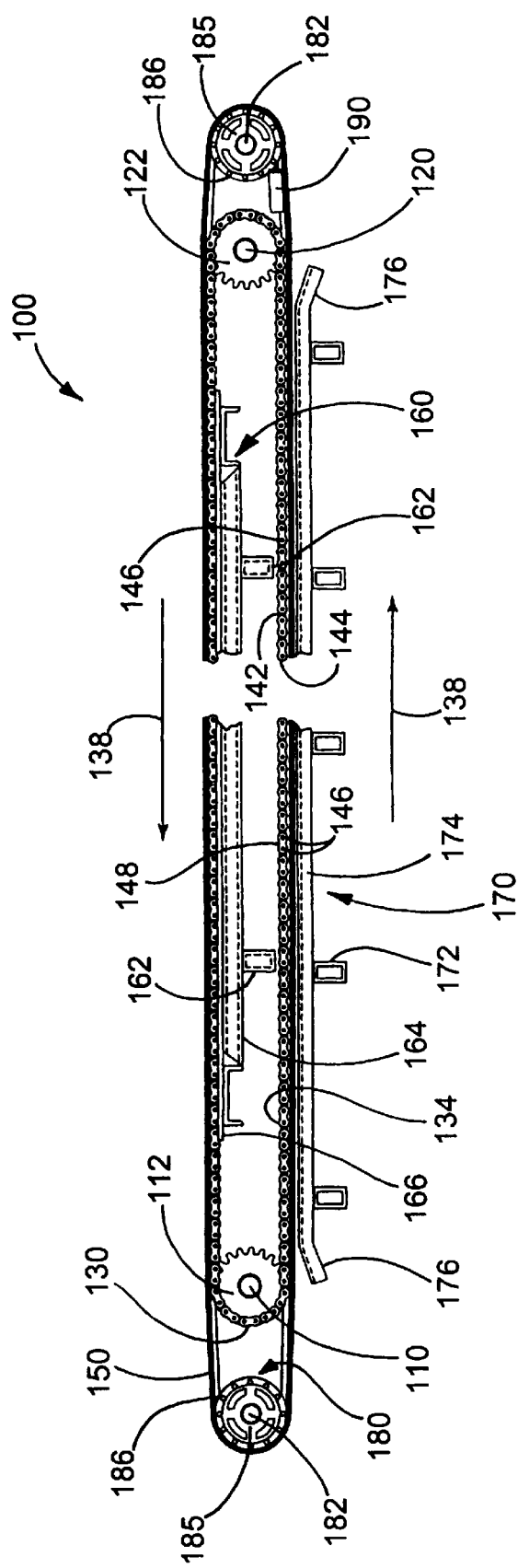
FIG. 4 is a partially fragmentary side elevational view of the conveyor mechanism.
Figure 5:
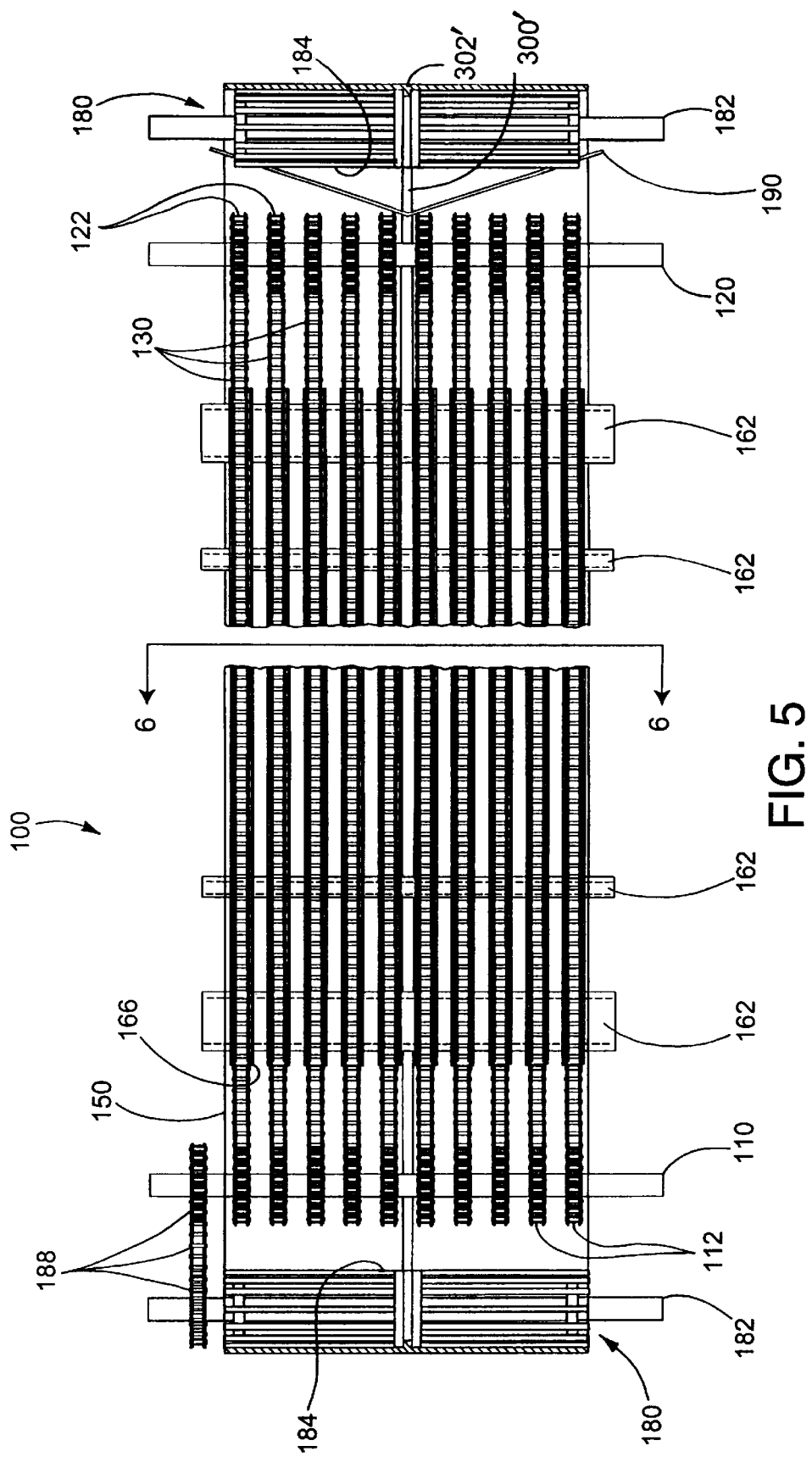
FIG. 5 is a top plan view of the conveyor mechanism depicted in FIG. 4, here showing the top portion of the flexible continuous belt member removed for clarity.

As best shown in FIGS. 1 and 2, the conveyor mechanism 100 of the present invention includes a first axle 110 disposed near the rear end 14 of the trailer 10, and a second axle 120 disposed toward the forward end 12 of the trailer 10. The first axle 110 is rotatably mounted relative to the trailer assembly 10 and is arranged substantially parallel to the bottom surface 16 thereof. In the illustrated embodiment, the first axle 110 also includes a plurality of spaced-apart drive sprockets 112, as shown in FIGS. 4 and 5. In operation, the first axle 110 and the attached drive sprockets 1 12 are rotated by a motor 115, as depicted in FIG. 2. The second axle 120, like the first axle 110, is rotatably mounted relative to the trailer assembly 10 and is arranged substantially parallel to the bottom surface 16 thereof. As best shown in FIGS. 4 and 5, the second axle 120 is spaced-apart from the first axle 110 and includes a plurality of spaced-apart idler sprockets 122. As is customary in the art, each idler sprocket 122 is aligned with one of the drive sprockets 112, is associated with that drive sprocket 112, and forms a set therewith. In an alternative arrangement, the idler sprockets can be eliminated altogether, and the chain can be turned at the second end by a non-sprocketed roller with associated guides. Although the motor 115, the first axle 110, and the drive sprockets 112 are shown at the rear end 14 of the trailer assembly 10, it will be appreciated by those skilled in the art that the second axle 120 and the idler sprockets 122 may alternatively be located at the rear end 14 of the trailer assembly 10. The drive is applied to one of the end sets of sprockets for convenience, it being realized that, if desired, the drive sprockets can be positioned at any convenient location along the run of the chains.

A plurality of endless chains 130 are entrained in meshing engagement with the respective sets of drive and idler sprockets 112 and 122. As best shown in FIGS. 1 and 4, each chain 130 forms a generally obround loop having an upper track portion 132 and a lower track portion 134. More specifically, each chain 130 includes a plurality of pivotably connected inner links 142 and outer links 144. As is customary in the art, each outer link 144 is alternatively and contiguously connected to one of the inner links 142 via a common pivot pin and surrounding cylindrical roller 146. Each adjacent inner and outer chain link 142 and 144 further includes a pitch-line 148, as defined by a line extending through the axis of adjacent pivot pins and surrounding cylindrical rollers 146 (see FIG. 4).

When the first axle 110 is rotated by the motor 115, the chains 130 move in a direction generally indicated by reference numeral 138. Although the chains 130 are depicted as moving in this direction, it will be readily appreciated by those skilled in the art that the chains 130 may alternatively move in the opposite direction by reversing the direction of the motor 115. In this way, cargo may be moved in either direction.

As best shown in FIG. 4, a flexible continuous belt member 150 is wrapped around the chains 130 and also around a pair of spaced-apart-pulleys 180 disposed outboard of the two sets of sprockets 112 and 122. More specifically, the belt member 150 frictionally engages the substantially flat upper track portions 132 of the chains 130 (i.e., the portions of the chain loops 130 disposed between the top of the drive and idler sprockets 112 and 122), and moves in conjunction therewith. Of course, a friction enhancing substance, or the like, may be applied to either the chain loops 130 or the inner surface of the belt member 150 in order to improve this frictional contact. Outboard of the sprockets 112 and 122, the belt member frictionally engages and wraps around the two pulleys 180. In this way, the sprockets 112 and 122 serve as reversal points for the chains 130, while the pulleys 180 serve as reversal points for the belt member 150. Of course, if the pulleys 180 were not provided (i.e., if the belt member 150 simply wrapped around the sprockets 112 and 122), the pitch diameter of the belt member 150 would be slightly greater than the pitch diameter of the chains 130 at the sprockets 112 and 122 (i.e., at the reversal points). This, in turn, would cause the linear velocity of the belt member 150 to be greater than the linear velocity of the chains 130 at these points (although the angular velocities would be the same) which, ultimately, would cause the belt member 150 to either slip or stretch in an unacceptable manner.

Thus, it is an important feature of the present conveyor mechanism that the two pulleys 180 automatically allow the belt member 150 to reverse direction without slipping or stretching. In particular, when the belt member 150 and the chains 130 are in frictional engagement, the velocities of the chains 130 and belt member 150 are identical because both are traveling in a straight line. When the belt member 150 separates from the chains 130 at the top of the drive sprockets 112 and at the bottom of the idler sprockets 122, respectively, however, the pulleys 180 will automatically assume an angular velocity which is equal to the angular velocity of the belt member 150 (if the pulleys 180 are not driven). In addition, the linear velocity of the belt member 150 will remain constant after it has separated from the chains 130 (i.e., the linear velocity of the belt member 150 will remain constant throughout its entire travel path). Thus, when the belt member 150 re-engages the chains 130 at the bottom of the drive sprockets 112 and at the top of the idler sprockets 122, respectively (i.e., 180° away from where the belt member 150 and the chains 130 originally separated), the linear velocity of the belt member 150 will be the same as the linear velocity of the chains 130. In this way, the velocity of the belt member 150 is synchronized with the velocity of the chains 130 at all points where they are in engagement (i.e., inboard of the drive and idler sprockets 112 and 122), and slipping and/or stretching of the belt member 150 with respect to the chains 130 at its reversal points is advantageously prevented. Indeed, without the pulleys 180 and the speed synchronization feature that they provide, the belt member 150 would either slip or stretch with respect to the chains 130 at these reversal points.

In operation, the pulleys 180 are normally driven by frictional contact with the moving belt member 150. If additional conveyor force is required, however, the pulleys 180 may alternatively be powered by an independent power source (not shown), or be powered by an optional drive chain and sprocket assembly 188, as shown, for example, in FIG. 5. If the pulleys 180 are driven by frictional contact with the moving belt member 150 (i.e., if the pulleys 180 rotate independently of the drive and idler sprockets 112 and 122), the speed synchronization feature is provided automatically since the pulleys 180 will be driven at the angular velocity necessary to match the linear velocity of the belt member 150. If however, the pulleys 180 are powered independently or are powered by the optional drive chain and sprocket assembly 188, the speed synchronization feature can be provided by varying either or both the diameter of the driven pulley and/or the rotational speed of the driven pulley. This rotational speed adjustment would normally be made in the gear or sprocket ratio of the first axle 110 and the shaft 182 of the driven pulley.

In either event, the objects being transported are loaded, piled, or stacked upon the moving belt member 150. However, because the weight of the cargo is shared by several (i.e., one or more) chain loops 130, the conveyor mechanism 100 of the present invention can use lighter, smaller, and less expensive chains 130 than the single belt slat-type conveyor mechanisms of the prior art (e.g., the conveyor mechanism disclosed in U.S. Pat. No. 5,102,285 (Gust)).

Figure 6:
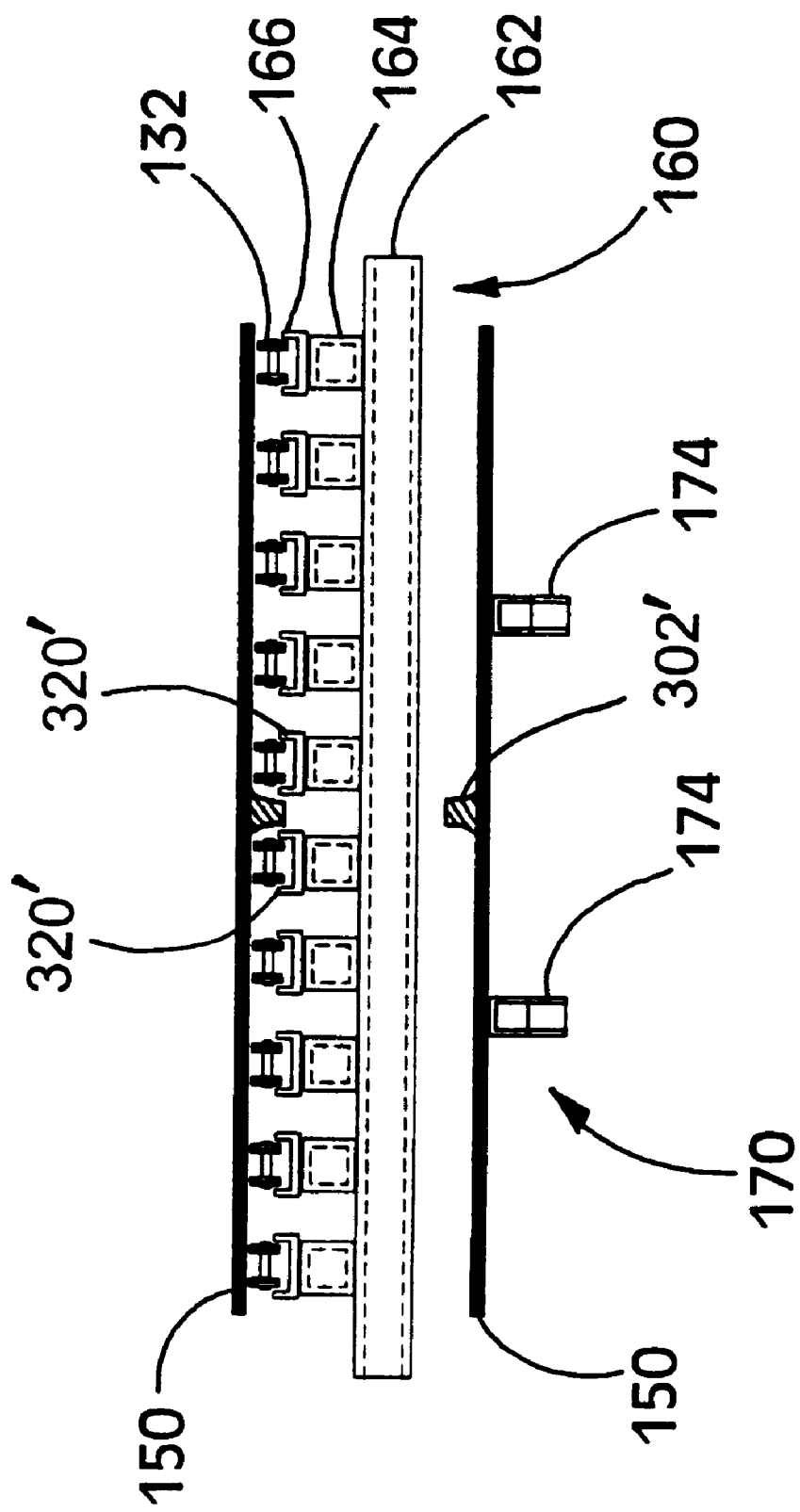
FIG. 6 is a cross-sectional view of the conveyor mechanism as seen in the direction of line 6—6 in FIG. 5, here showing the lower track portion of the chain removed for clarity.

In order to provide added support to the chains 130 and belt member 150, a frame 160 having a plurality of substantially frictionless channel guides 166 is arranged within the loop of each chain 130. As best shown in FIG. 3, the frame 160 includes a plurality of transverse members 162 which extend between and are mounted to the vertical support plates 26 of the trailer assembly 10. The frame 160 also includes and a plurality of longitudinal members 164 which are attached to the transverse members 162. As shown in FIGS. 4–6, the longitudinal members 164 are arranged substantially perpendicular to the transverse members 162, the channel guides 166 are attached to the longitudinal members 164, and the channel guides 166 receive the upper track portions 132 of each respective chain 130. In keeping with an important aspect of the present invention, each channel 166 is either constructed from or coated with a friction reducing surface (e.g., polymer material). In this way, friction losses are substantially reduced. The channels 166 also guide the chains 130 in a way that provides lateral stability to the chains 130 and belt member 150. In operation, the conveyor mechanism 100 of the present invention can easily accommodate heavy loads because: (1) the transverse members 162 of the frame 160 are mounted directly to the support plates 26 of the trailer 10; and (2) numerous chains 130 are spaced across the width of the belt member 150.

A support assembly 170 is also provided for supporting the underneath side of the belt member 150 and the lower track portions 134 of the chains 130. As best shown in FIG.

1, the support assembly 170 is disposed between the bottom surface 16 of the trailer assembly 10 and the belt member 150. In the illustrated embodiment, the support assembly 170 includes a plurality of transverse beams 172 arranged generally parallel to the transverse members 162 of the frame 160, as shown, for example, in FIG. 4. The support assembly 170 also includes one or more longitudinal beams 174 arranged generally perpendicular to the transverse beams 172 and attached to the under side thereof. As shown in FIGS. 1 and 4, the longitudinal beams 174 preferably include bent-down end portions 176 which prevent the belt member 150 from becoming entangled therewith.

A deflector plate 190—disposed between the idler sprockets 120 and the forwardmost pulley 182—is also provided for dislodging stones, rocks, and other debris from the inner surface of the belt member 150. As shown in FIGS. 4 and 5, the deflector plate is generally V-shaped and is arranged adjacent to the inner surface of the belt member 150. In use, the deflector plate 190 prevents debris from entering the forwardmost pulley 180 which helps reduces chain wear and sprocket damage.

In practicing the present invention, the conveyor mechanism is modified to include means for maintaining lateral tracking of the belt as it is rotated by the drive chains to either load or unload the trailer. An improved version of the conveyor mechanism is illustrated in FIG. 7.

Figure 7:
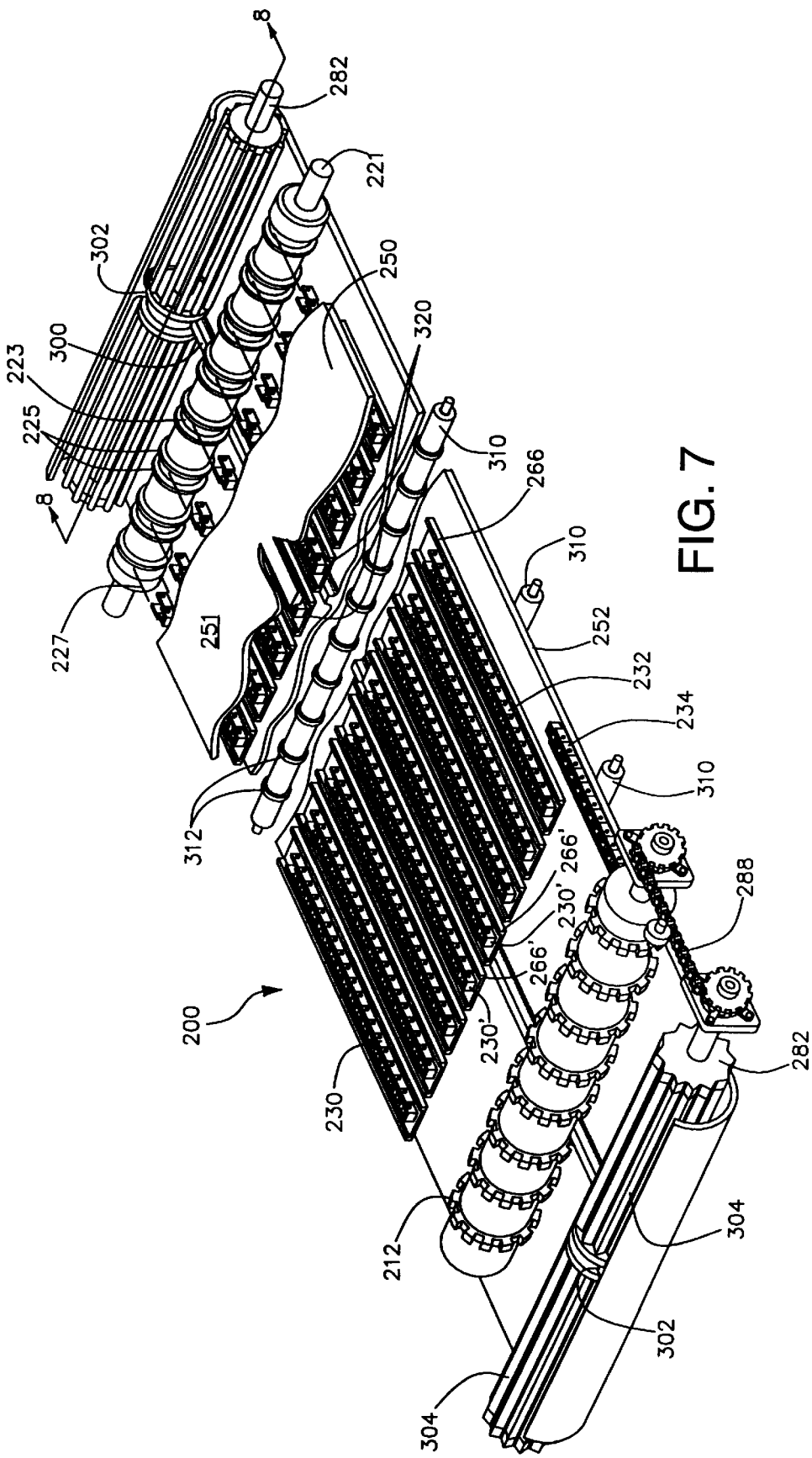
FIG. 7 is a perspective view showing the cooperating elements on the belt and belt drive which maintain lateral tracking of the belt.

FIG. 7 shows a conveyor mechanism 200 having a chain drive constructed substantially as described in connection with the prior embodiments. Drive sprockets 212 engage multiple runs of chain which form top 232 and bottom 234 runs. Rather than using idler sprockets at the non-driven side of the chain, FIG. 7 illustrates the use of a return roller 221 having a plurality of tracks 223 formed therein by bracketing ridges 225. The chains 230 are carried from the lower to the upper run in contact with the tracks 223 between the ridges 225 as suggested by the lead lines 227.

As in the prior embodiment, the belt 250 has an upper run 251 and a lower run 252, and is turned by a pair of turning rollers 282,282'. The embodiment of FIG. 7 illustrates a drive chain 288 coupled from the sprocket drive 212 to the rearward roller drive 282 to provide additional driving force to the belt 250.

In practicing this aspect of the invention, the belt and guide rollers are provided with interfitting lateral stabilizing guides constructed and arranged to oppose lateral mistracking of the belt as it is driven by the chains and chain drive. In the preferred embodiment, the interfitting guides comprise at least one guide ridge 300 formed on the inner surface of the guide belt fitting into and cooperating with grooves 302 formed in the guide rollers. Thus, as shown in FIG. 7, the belt is formed to include at least one guide ridge 300 formed on the inner surface thereof. In the illustrated embodiment the ridge 300 is formed approximately centrally of the belt and runs the entire length of the belt to form a continuous guide ridge for maintaining lateral stability. Preferably, the undersurface of the belt (the surface opposite the load carrying outer surface) is substantially flat except for the guide ridge or ridges (see below). The guide ridge can be formed in the shape of a conventional V-belt to readily interface with belt drive pulleys on the guide rolls. The guide ridge is preferably formed during manufacture of the belt so that problems of separation are avoided. The guide ridge and the corresponding interfitting groove have substantial interfering contact. For example, the guide ridge should rise from the surface of the belt by at least about one-half inch, and the corresponding grooves should be deep enough to receive substantially the entire guide ridge. While the arrangement having ridges on the belt and grooves in the guide rollers is preferred for reliability and ease of manufacturability, other arrangements, including the inverse configuration with grooves in the belt and ridges on the rollers are considered to be within the scope of the invention.

For purpose of guiding the belt, the guide rollers 282,282' include relieved sheave sections 302 having a depth and width which fairly closely receive the guide rib 300 on the belt. Since the rollers 282,282' are fixed in bearings and prevented from lateral displacement, and since the ridge 300 rides in the grooves 302, the belt will be stabilized both with respect to the rollers and with respect to the apparatus which carries the conveyor.

The belt turning rollers 282, 282' can be formed as simple multiple section assemblies with a central sheave 302 bracketed by a pair of belt-engaging sections 304, all affixed to a central shaft. Other forms of manufacture can be suitably employed. The important fact, however, is the provision of the guide slots on the rollers opposite each other and positioned to engage the longitudinal rib 300 which runs the length of the belt, so as to control or prevent lateral movement of the belt and maintain lateral stability.

It is noted that the previously described embodiments also include the specially formed belt rollers 182 having central sections 302' engaged with a central ridge 300' formed in the belt on the inner surface thereof. For example, the central ridge and guide tracks can be seen in FIGS. 2, 3, 5 and 6

The embodiment of FIG. 7 includes a certain other differences with respect to the first described embodiment. In the prior embodiment a lower support assembly 170 for the belt was made up of longitudinal beams 174 and transverse beams 172. The FIG. 7 implementation shows the use of a plurality of support rollers 310 which are simply journaled in brackets affixed to the base of the truck and are adapted to have their upper surface engage the lower surface of the belt for supporting the lower run 252 of the belt 250 on its return pass. The broken away section of FIG. 7 shows that it is preferable to include a plurality of guide ridges 312 on the rollers 310 so as to elevate the belt above the roll to minimize transfer of material from the belt to the roll, while adequately maintaining support of the lower run 252. It has been found that three or four rollers disposed along the length of the belt are adequate to provide the necessary support function.

It will also be appreciated from FIG. 7 that a central pair of chains 230' and chain guides 266' are disposed on either side of and bracket the guide rib 300. In some cases it may be preferable to move the bracketing chain guides 230' closer together to bracket the guide rib 300, to provide further longitudinal guidance of the belt in its loaded upper run 251 and substantially across the entire length of its surface. The chains and guide tracks are positioned such that there is typically no direct contact with the rib, and there is clearance for the rib to run between the chains during normal operation of the belt. However, if an off-center load tends to drive the belt locally toward one side or the other, the guide rib 300 will engage the appropriate chain which in turn will engage the appropriate guide track to limit deflection of the belt and maintain lateral tracking thereof (FIG. 9).

The embodiment of FIG. 7 is shown with only a single guide rib 300 and associated guide apparatus. In some cases it may be desirable to provide additional ribs, and that is entirely within the scope of the invention. For example, FIG. 8 shows a section of the apparatus of FIG. 7, but including three rather than one guide ribs and associated apparatus in the belt turning roll. It will be seen that the turning roll 282" has a series of three belt engaging grooves 302' formed therein, and that the belt 250' has three guide ridges 300' formed on the inside surface thereof. The positioning is such that the ribs engage the guide grooves to maintain lateral tracking of the belt. In this embodiment it is also possible to position the chains and chain guides such that they bracket and therefore constrain at least some and probably all of the belt guide ribs, so that the three guide ribs 302' are bracketed between pairs of chains and in turn chain guides to further maintain lateral stability. For most situations it has been found preferable because of simplicity of design and ease of manufacture to use only a single guide rib as illustrated in FIG. 7. However, FIG. 8 shows the applicability of the invention the use of even further guide apparatus for the purposes of maintaining lateral stability in particularly difficult applications.

Thus it will be apparent that what has been provided is an improvement to our basic conveyor mechanism which finds particular applicability in live bottom trailers. The conveyor mechanism is rugged and reliable, having a plurality of chains underlying a single continuous belt, with the upper runs of the chains being carried in well-supported guide tracks to provide support for the upper run of the belt and the load carried thereon. The chains and belts are turned on different sets of turning apparatus, with the major run of the belt overlying the drive chains for support thereof. The belt and its turning rollers are provided with interfitting lateral stabilizing guides which are constructed and arranged to oppose lateral mistracking of the belt. In the preferred embodiment the belt is configured with one or more guides ridges formed in the surface thereof, and the guide ridges engage guide tracks in the belt driving apparatus, most particularly the turning rollers, so as to maintain lateral stability. Lateral stability is further enhanced by bracketing the guide ridge in and at least the upper run of the belt between a pair of chains and chain guides to assist in maintaining lateral stability at intermediate position of the belt between the belt turning rollers.

While the present invention has been described and disclosed with an emphasis upon preferred embodiments, it will be understood, of course, that the present invention is not strictly limited thereto. Since modifications may be made to the structures disclosed herein—particularly in light of the foregoing teachings—without departing from the invention. The following claims are intended to cover all structures that fall within the scope and spirit of the present invention.

What is claimed:

1. A conveyor system comprising in combination:
   a support structure,
   a power driven chain drive carried by the support structure and including a plurality of drive chains tensioned around a pair of transition rollers to define upper chain flights and lower chain flights joined at the transition rollers,
   a load-carrying endless belt disposed around the chains and having an upper run overlying and supported by the upper chain flights, and a lower run underlying the lower chain flights,
   guide rollers for the belt positioned outboard of the chain transition rollers for transitioning the belt between the upper run and the lower run, the belt guide rollers being positioned outboard of the chain transition rollers so that the belt is out of contact with the chains during the transition from the upper run to the lower run,
   a plurality of rigid guide tracks one for each drive chain, the guide tracks being fixed to the support structure and positioned to guide and support the upper flights of the chains, whereby a load placed on the belt is driven by frictional contact between the belt and chains,
   the plurality of guide tracks and chains being sufficient in number to support the endless belt when carrying loads distributed on the belt,
   the endless belt having at least one guide ridge formed on the inner surface thereof opposite the outer surface which carries the load, and
   the guide rollers each having at least one circumferentially grooved section engaging the at least one guide ridge on the belt for opposing lateral mistracking of the belt as it is driven by frictional contact between the belt and chains.

2. The conveyor system of claim 1 in which the at least one guide ridge projects at least about one-half inch from the inner surface of the belt.

3. The conveyor system of claim 1 in which the belt is formed with a plurality of the guide ridges in spaced apart parallel relation, and the guide rollers include a corresponding plurality of the circumferential grooved sections positioned to engage the respective guide ridges to enhance lateral tracking of the belt.

4. The conveyor system of claim 1 wherein a pair of said chains and rigid guide tracks bracket the at least one guide ridge on the inner surface of the belt over a substantial portion of the upper run thereof to provide lateral guidance for the belt intermediate the guide rollers.

5. A conveyor system as defined in claim 4, wherein there is further provided a hopper having a length at its bottom which is approximately the same as the length of the upper run and having a width which is slightly less than the width of the belt, the bottom of the hopper closely overlying the belt so that running of the belt by driving of the chains will effect the unloading of the hopper.

6. A conveyor system as defined in claim 5, wherein the support structure is a bed of a trailer, the hopper being a load carrying structure of the trailer, and the conveyor serving as a live bottom for the trailer.

7. The conveyor system of claim 1 further including a plurality of support rollers underlying the lower run of the belt for supporting the lower run of the belt and a lower flight of the drive chains.

8. A conveyor system for transferring a load from a load carrying hopper and comprising in combination:
   a hopper structure having an open top with front, back and side walls terminating in a bottom opening of a given length and width,
   a conveyor mechanism positioned just below the hopper bottom and having a width which is about the same as the given width,
   the conveyor mechanism having a chain drive and support including a plurality of drive chains distributed across the width of the conveyor and tensioned about chain transition rollers positioned near the front and back of the hopper,
   the chain transition rollers defining an upper chain flight and a lower chain flight with the upper chain flight being positioned just below the bottom of the hopper,
   an endless belt positioned around the chains and having upper and lower runs separated by belt transition rollers which are separate from the chain transition rollers, the belt transition rollers being positioned outboard of the chain transition rollers so that the upper run of the belt follows a plane defined by the upper chain flight of the chains which continues from the chain transition rollers to the belt transition rollers the upper run of the belt covering all of the upper chain flight for being driven thereby and closing the bottom opening of the hopper, the respective transition rollers being positioned so that the transition of the belt from the upper to the lower run occurs when the belt is out of contact with the chains, a plurality of guide tracks, one for each upper flight and underlying the upper flights to support each chain during the majority of its travel along the upper flight, thereby to assist in carrying a load imposed by material in the hopper carried on the belt, a drive for the chains which causes the chains to rotate in a first direction to carry the upper run of the belt in such a direction as to convey material in the hopper toward the back of the hopper for unloading, the endless belt having an undersurface opposite the load carrying surface, the undersurface being formed with at least one guide ridge running longitudinally of the belt intermediate the belt edges, and the transition rollers each having at least one circumferential groove sized and positioned to engage the at least one guide ridge on the belt for resisting lateral mistracking of the belt as it is driven by the chains to convey material in the hopper.

9. The conveyor system of claim 8 in which the undersurface of the belt is substantially flat having a single raised guide ridge projecting from the flat surface thereof.

10. The conveyor system of claim 8 in which the undersurface of the belt contains a plurality of guide ridges running parallel to each other and longitudinally of the belt, and the transition rollers have a plurality of circumferentially indented sections positioned and sized to engage the respective guide ridges for preventing lateral mistracking of the belt.

11. The conveyor system of claim 8 in which a pair of said chains and guide tracks are disposed on either side to bracket the at least one guide ridge on the upper run of the belt, thereby to provide lateral guidance for the belt intermediate the transition rollers.

12. The conveyor system of claim 8 further including a plurality of support rollers underlying the lower run of the belt for supporting the lower run of the belt and the lower chain flight.

13. A conveyor system as defined in claim 8, wherein the drive means is reversible so as to cause the drive chains to rotate in a second direction to convey material into or reposition material in the hopper.

14. The conveyor system as defined in claim 8, wherein the hopper is mounted to a wheeled trailer for securing thereto as a load carrying structure of the trailer, and the conveyor serves as a live bottom for the trailer.

15. A conveyor system comprising in combination:

a support structure, a power driven chain drive carried by the support structure and including a plurality of drive chains tensioned around a pair of transition rollers to define upper chain flights and lower chain flights joined at the transition rollers, a load-carrying endless belt disposed around the chains and having an upper run overlying and supported by the upper chain flights, and a lower run underlying the lower chain flights, guide rollers for the belt positioned outboard of the chain transition rollers for transitioning the belt between the upper run and the lower run, the belt guide rollers being positioned outboard of the chain transition rollers so that the belt is out of contact with the chains during the transition from the upper run to the lower run, a plurality of rigid guide tracks one for each drive chain, the guide tracks being fixed to the support structure and positioned to guide and support the upper flights of the chains, whereby a load placed on the belt is driven by frictional contact between the belt and chains, the endless belt and guide rollers having interfitting lateral stabilizing guides constructed and arranged to oppose lateral mistracking of the belt as it is driven by frictional contact between the belt and chains.

16. The conveyor system of claim 15 in which the interfitting lateral stabilizing guides comprise at least one guide ridge on the belt fitting into and cooperating with grooves on the guide rollers.

* * * * *